Aug. 2, 1966   J. R. FITZSIMMONS   3,264,527
MOUNTING ARRANGEMENT
Filed Aug. 13, 1964
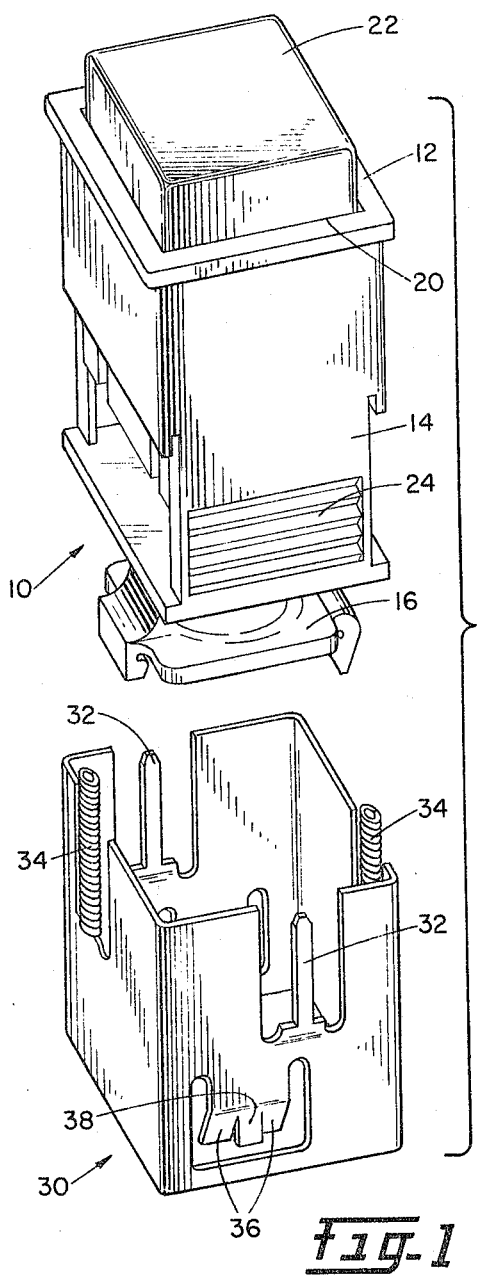
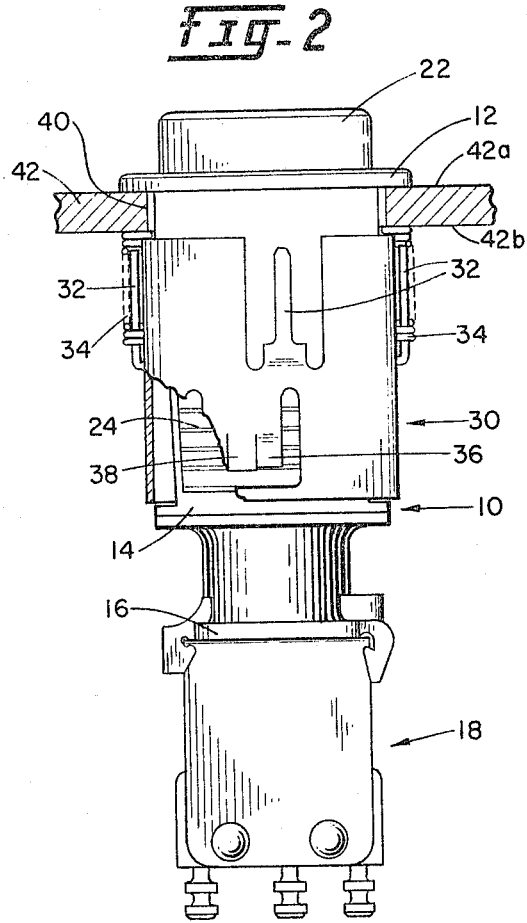
INVENTOR.
JAMES R. FITZSIMMONS
BY
ATTORNEY.

United States Patent Office 3,264,527
Patented August 2, 1966

3,264,527
MOUNTING ARRANGEMENT
James R. Fitzsimmons, Freeport, Ill., assignor to Honeywell Inc., Minneapolis, Minn., a corporation of Delaware
Filed Aug. 13, 1964, Ser. No. 389,447
6 Claims. (Cl. 317—101)

The present invention is directed to an arrangement wherein a structure or device can be associated with a support such as a panel in a manner to provide a so-called "semi-hard" mount therebetween which has the advantages of both a hard or secure mount and a resilient mount without the disadvantages of either.

Hard or secure mounting of devices to a panel can be accomplished in several ways, as for example, by means of conventional fasteners such as threaded members, camming arrangements, and snap rings. With such expedient tools are usually required to accomplish the mounting. The tools necessitate working space to allow for tool "swing," insertion, gripping, etc. which can increase the effective area required by each device on the panel or the conventional fasteners per se can bring this condition about. While hard or secure mounting of devices can be accomplished without tools, for example, by snapping the devices into the panel through the expedients of detent elements and one-way fasteners, a problem arises in that loose fits between the devices and the panel frequently results because of variations in panel thicknesses and tolerance build up in the detent elements or one-way fasteners.

Resilient mounting of devices to a panel can be accomplished in numerous ways, but if the panel and/or devices are subjected to vibration or shocks, relative movements can be imparted between the panel and the devices which can lead to damage of the devices. Further, if a push-in type mount is utilized, upon extreme shocks being experienced, the device may be "popped" out of the panel.

In the present invention, a device having a mounting portion is arranged to be mounted to a panel by means of a mounting member which can be slidably moved with respect to the device so that the panel is disposed between the mounting portion and the mounting member. Detent fastening means between the device and the mounting member and resilient means provided between the panel and the combination of the device and the mounting member cooperate to locate the device to the panel. The detent fastening means provide a semblance of a hard or secure mount but as indicated previously variations in panel thicknesses and tolerance build up in the detent fastening means do not allow for a true hard or secure mount and therefore the resilient means are provided so no loose fits are encountered. Thus, with such an arrangement, a semi-hard mount is provided which has the advantages of both a hard or secure mount and a resilient mount without the drawbacks of either as set forth above.

Therefore, it is an object of the present invention to provide a semi-hard mounting arrangement for a device to a support having the attributes of both a hard or secure mount and a resilient mount without the disadvantages each inherently have;

Another object of the present invention is to provide for semi-hard mounting a device to a support which does not involve the use of tools;

A further object of the present invention is to provide a semi-hard mounting arrangement for a device with respect to a panel which does not increase the effective panel area over that required to accommodate the device per se;

A still further object of the present invention is to provide a semi-hard mounting arrangement for a device with respect to a panel whereby various thicknesses of panel can be accommodated;

These and other objects will become more apparent from a reading of the following specification and appended claims in conjunction with the drawing in which:

FIGURE 1 is a perspective view of a housing and a tubular mounting member incorporating a specific form of the invention; and FIGURE 2 is an assembly view with the elements of FIGURE 1 mounted to a panel with the invention performing its intended function.

In the drawing, a generaly rectangular parallel-piped housing 10 which can be formed of an appropriate thermoplastic or thermoset material includes a mounting portion or flange 12 at a first extremity, a body portion, and an integral mounting clip 16 at a second opposite extremity for supporting a switch module 18, shown only in FIGURE 2, which can be of the type disclosed in the W. T. Campe et al. Patent 2,935,653. The housing 10 has an opening 20 to accept a member 22 of translucent or transparent material which can be either an indicator member or an indicator-push button member dependent upon whether the device is to be used as an indicating arrangement only or as indicating and switching arrangement. Illumination means, not shown, is disposed in the body 14 below the member 22. Likewise, actuating means, not shown, for the switch module 18 is located in the body 14. On opposite exterior side walls of the body 14 near the second extremity of the housing 10, a number of side by side ridge depressions 24 are provided which are transverse to the longitudinal axis of the housing 10.

Tubular member 30 which can be formed of an appropriate resilient metallic, thermoplastic or thermoset material is slightly larger in its internal dimensions as measured transverse to the longitudinal axis thereof than the external dimensions of the body 14, the mounting clip 16, and the switch module 18 as measured transverse to the longitudinal axis of the housing 10. An arm 32 is formed in each of the side walls of the tubular member 30 and each is offset outwardly from the plane of the respective wall. The arms 32 can accommodate resilient means in the form of coil springs 34 which are shown on two opposite arms. The coil springs 34 can be attached to the tubular member 30 at their lower extremity in a conventional manner so as to form a unitary structure. Also formed in two opposite walls of the tubular member are oppositely disposed tab portions 36, only one set of which is visible, each of which is offset inwardly from the plane of the respective wall.

Tongues 38, only one of which is visible, are offset outwardly from the plane of the respective wall and are located between the tabs 36.

Referring now particularly to FIGURE 2, it will be noted that the housing 10 is disposed in opening 40 of a panel 42 with the flange 12 engaging surface 42a of the panel and the tubular member 30 in place with respect to the housing 10 and panel 42 and with the coil springs 34 engaging surface 42b of the panel 42.

To mount the housing 10 and the associated switch module 18 to the panel 4, the tubular member 30 is slidably disposed past the switch module 18 and the mounting clip 16 and over the body 14 so that the coil springs 34 which extend beyond the upper edge of the tubular member 30 engage surface 42b of the panel 42. The tubular member 30 is moved as far as possible towards surface 42b against the bias of the coil springs 34 and until they approach a solid length. As the tubular member 30 is positioned with respect to the housing 10 and panel 42, the resilient tab portions 36 snap into successive ridge depressions 24 and ultimately come to rest in the appropriate ones thereof dependent upon the thickness of the panel 42. The tabs 36 because of their resilience and inward form combine with the ridge depressions 24 to provide an adequate detent fastener between the housing 10 and tubular member 30.

Of course, by forcing the coil springs 34 to approach their solid length, an almost hard mount is provided although it will be recognized that because of the back off required for the tabs 36 to engage the proper ridge depressions 24 a true hard mount is not ordinarily possible and can be accomplished only in the special case. However, since the coil springs 34 do not ordinarily assume their solid length, some resilience is provided between the housing 10 and tubular member 30 and panel 42 resulting in a semi-hard mount.

Because of the various ridge depressions 24 and the bias provided by the coil springs 34, it will be appreciated that various thicknesses of panel can be accommodated and further that various degrees of a semi-hard mount are possible.

If it is necessary to remove the housing 10 and associated switch module 18 from the panel 42, the tongues 38 need merely be moved outwardly so as to remove the tabs 36 from the ridge depressions 24 whereupon the tubular member 30 can be slidably moved away from the panel 42 over the body 14 and past the mounting clip 16 and switch module 18.

Since no tools are required to mount the devices incorporating the present invention, no space provision for tool "swing" and the like is necessary and the total panel area required for each device is determined by the major dimensions of the device which in the embodiment disclosed are the major dimensions of the flange 12.

Further note should be taken that with the mounting arrangement of the present invention only a single loose part is involved insofar as mounting is concerned, that being the tubular member 30 and coil springs 34 unitary structure.

Modifications can of course be made to the embodiment disclosed herein and therefore the scope of the invention should be determined from the following claims.

I claim:

1. A mounting arrangement comprising: a generally rectangular parallelepiped housing having a flange proximate a first extremity and a plurality of side by side ridge depressions transverse to the longitudinal axis of said housing located on two opposite outer side walls near the second opposite extremity, said housing arranged to be disposed in a complementary opening in a mounting panel with the surface of the flange facing the second extremity of said housing engaging the surface about the opening on a first side of the panel; and a tubular member arranged to be slidably disposed over the second extremity of said housing and toward the second opposite side of said panel, said tubular member supporting coil springs on two opposite sides thereof which extend therebeyond toward said first extremity, the axes of said coil springs being parallel to the longitudinal axis of said tubular member and engageable with the second side of the panel, said tubular member further including resilient tab portions on two opposite sides thereof each for snapping into the the appropriate ridges of said housing to locate said tubular member with respect to said housing and the panel and against the bias of said coil springs to provide a semi-rigid mounting of said housing with respect to the panel.

2. A mounting arrangement comprising: a housing having a flange proximate a first extremity and at least one depression transverse to the longitudinal axis of said housing located at each of two opposite outer side wall positions near the second opposite extremity, said housing arranged to be disposed in a complementary opening in a support with the surface of the flange facing the second extremity of said housing engaging the surface about the opening on a first side of the support; and a tubular member arranged to be slidably disposed over the second extremity of said housing and toward the second opposite side of said support, said tubular member supporting spring means on two opposite sides thereof which extend therebeyond toward said first extremity, so that the outer extremities of said spring means engage the second side of the support, said tubular member further including a tab portion at each of two opposite positions each for engagement with the depressions of said housing to locate said tubular member with respect to said housing and the support and against the bias of said spring means to provide a semi-rigid mounting of said housing with respect to the support.

3. A mounting arrangement comprising: a housing having a flange proximate a first extremity and including at least one depression on an outer side wall thereof, said housing arranged to be disposed in a complementary opening in a support with the surface of the flange facing the second extremity of said housing engaging the surface about the opening on a first side of the support; and a tubular member arranged to be slidably disposed over the second extremity of said housing and toward the second opposite side of said support, said tubular member supporting resilient means which extends therebeyond, so that the outer extremity of said resilient means engages the second side of the support, said tubular member further including a portion for engagement with the depression of said housing to locate and secure said tubular member with respect to said housing and the support and against the bias of said resilient means to provide a semi-rigid mounting of said housing with respect to the support.

4. A mounting arrangement comprising: a housing having a flange proximate a first extremity and arranged to be disposed in a complementary opening in a support with the surface of the flange facing the second opposite extremity of said housing engaging the surface about the opening on a first side of the support; and a tubular member arranged to be slidably disposed over the second extremity of said housing and toward the second opposite side of said support, said tubular member supporting resilient means which extend therebeyond, so that the outer extremity of said resilient means engages the second side of the support, said housing and said tubular member including detent fastener means therebetween to locate said tubular member with respect to said housing and the support and against the bias of said resilient means to provide a semi-rigid mounting of said housing with respect to the support.

5. A mounting arrangement comprising: a housing having a flange proximate a first extremity and arranged to be disposed in a complementary opening in a support with the surface of the flange facing the second opposite extremity of said housing adjacent the surface about the opening on a first side of the support; and a tubular member arranged to be slidably disposed over the second extremity of said housing and toward the second opposite side of said support; and resilient means disposed between the support member and the combination of said housing and said tubular member for engagement therebetween; said housing and said tubular member further including detent fastener means therebetween to locate said tubular member with respect to said housing and the support and against the bias of said resilient means to provide a semi-rigid mounting of said housing with respect to the support.

6. A mounting arrangement comprising: a structure having a mounting portion and arranged to be disposed in a complementary opening in a support with the mounting portion adjacent the surface about the opening on a first side of the support; a mounting member arranged to be slidably moved with respect to said structure and toward the second opposite side of said support; and resilient means disposed between the support member and the combination of said structure and said mounting member for engagement therebetween; said structure and said mounting member including detent fastener means therebetween to locate said mounting member with respect to said structure and the support and against the bias of said resilient means to provide a semi-rigid mounting of said structure with respect to the support.

No references cited.

ROBERT K. SCHAEFER, *Primary Examiner.*

KATHLEEN H. CLAFFY, *Examiner.*

J. J. BOSCO, *Assistant Examiner.*